May 16, 1950
H. E. WILSON ET AL
METHOD AND APPARATUS FOR WRAPPING
SAW BLADES OR THE LIKE
Re. 23,231
Original Filed Feb. 27, 1946
5 Sheets-Sheet 1
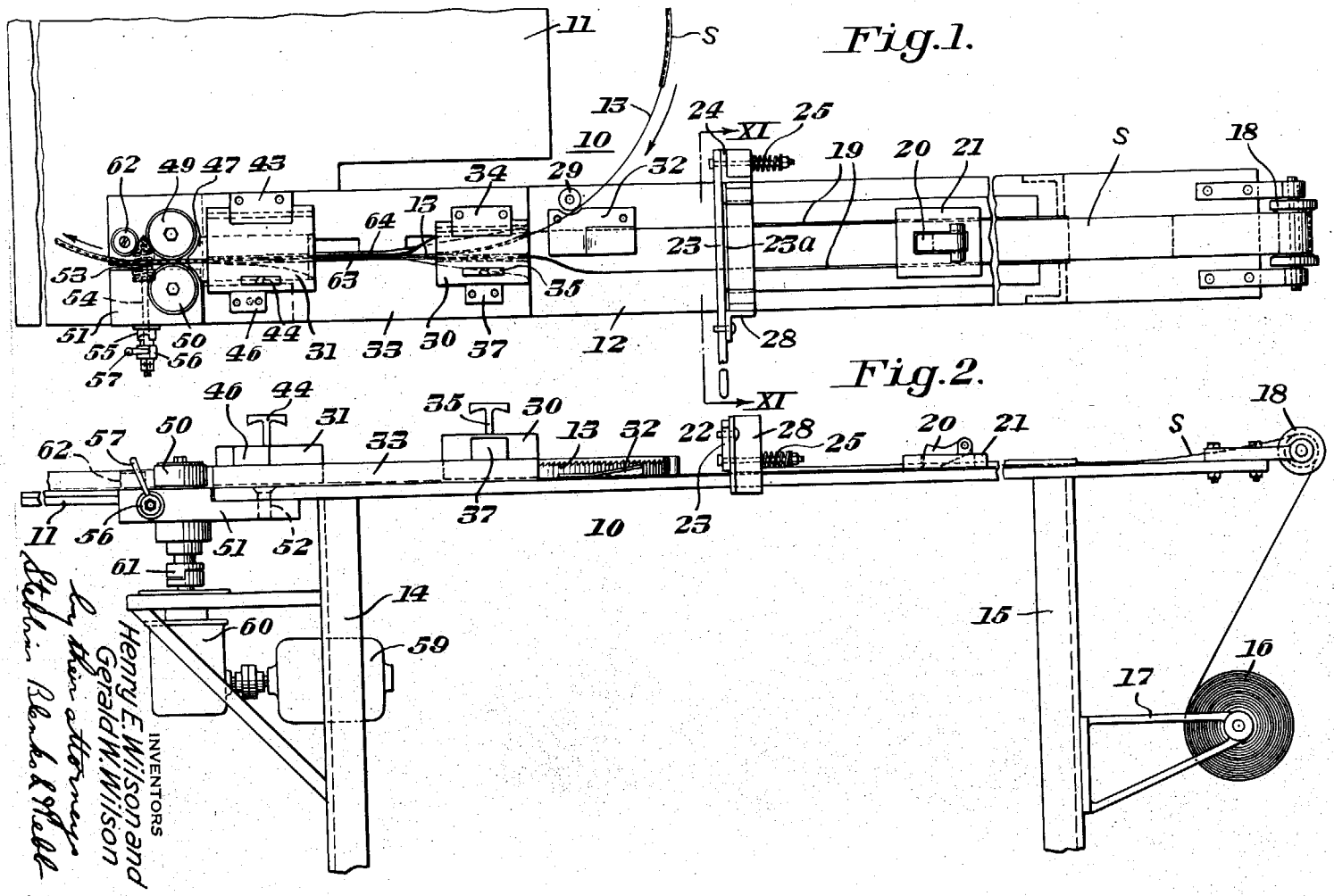

INVENTORS
Henry E. Wilson and
Gerald W. Wilson
by their attorneys
Stebbins, Blenko & Webb May 16, 1950 H. E. WILSON ET AL Re. 23,231

METHOD AND APPARATUS FOR WRAPPING SAW BLADES OR THE LIKE

Original Filed Feb. 27, 1946 5 Sheets-Sheet 3

INVENTORS
Henry E. Wilson and
Gerald W. Wilson
by their attorneys
Stebbins, Blenko & Webb May 16, 1950
H. E. WILSON ET AL
METHOD AND APPARATUS FOR WRAPPING
SAW BLADES OR THE LIKE
Re. 23,231
Original Filed Feb. 27, 1946
5 Sheets-Sheet 4
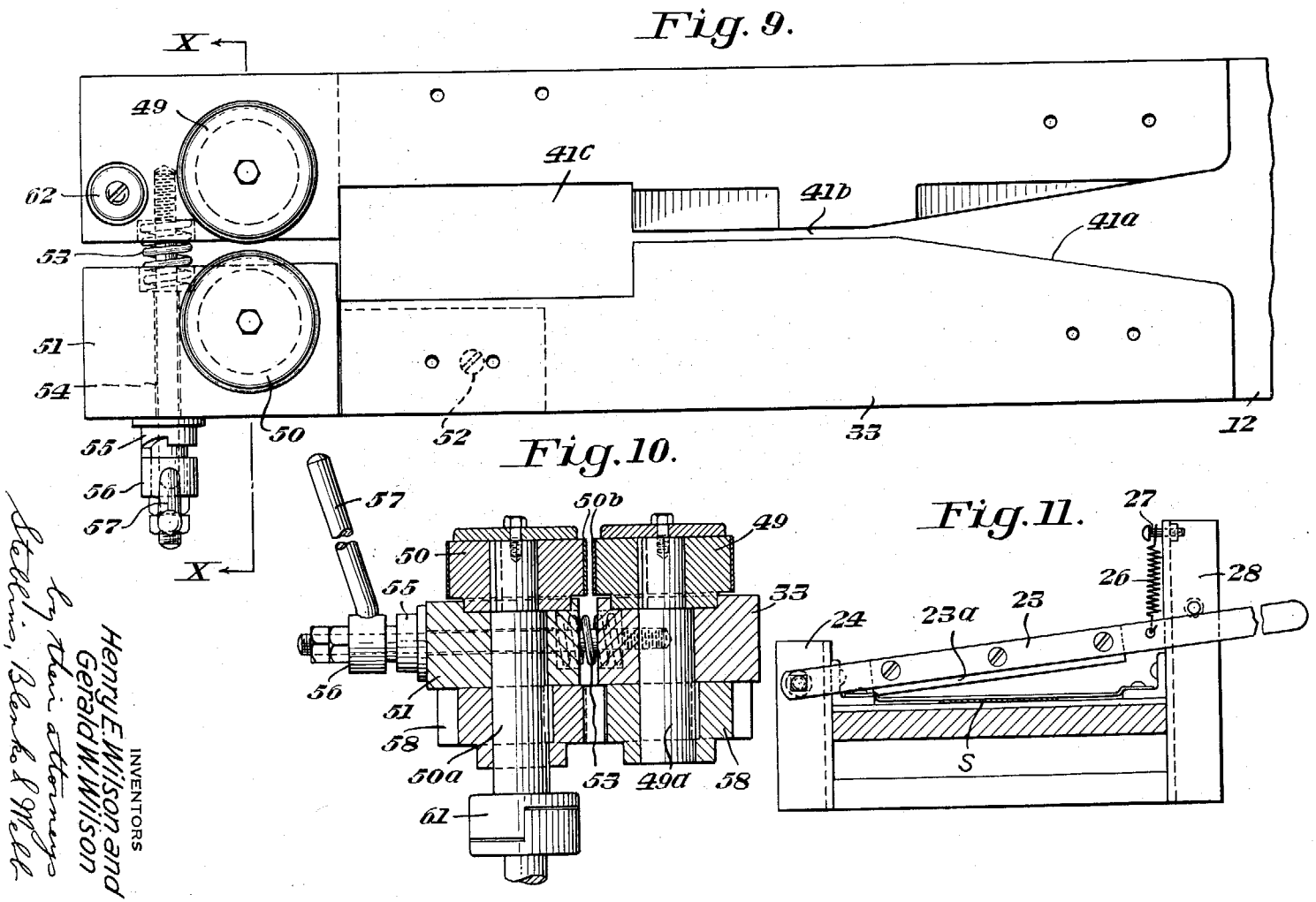
INVENTORS
Henry E. Wilson and
Gerald W. Wilson
by their attorneys
Stellins, Blenko & Webb INVENTORS
Henry E. Wilson and
Gerald W. Wilson
by their attorneys
Stebbins, Blenko & Klett Reissued May 16, 1950 Re. 23,231

UNITED STATES PATENT OFFICE 23,231

METHOD AND APPARATUS FOR WRAPPING SAW BLADES OR THE LIKE

Henry E. Wilson and Gerald W. Wilson, Grand Junction, Colo., assignors to Pittsburgh-Erie Saw Corporation, Pittsburgh, Pa., a corporation of Delaware Original No. 2,458,971, dated January 11, 1949, Serial No. 650,598, February 27, 1946. Application for reissue November 29, 1949, Serial No. 129,892

8 Claims. (Cl. 93—3)

Matter enclosed in heavy brackets [ ] appears in the original patent but forms no part of this reissue specification; matter printed in italics indicates the additions made by reissue

This invention relates to the art of wrapping and, in particular, to a method and apparatus for wrapping thin, flat articles, specifically endless bands, such as band-saw blades.

Because of the lack of a satisfactory machine for wrapping band-saw blades, it has been the practice heretofore to ship them bare in cylindrical containers after doubling them on themselves several times to provide a multiple loop of reduced diameter. When several blades are thus packed in the container, the teeth of the blades are subjected to direct contact with the backs of adjacent blades and, under the shock and vibration incident to handling and shipping, the sharpness of the teeth is materially impaired. We have invented a novel method and apparatus for applying a wrapping to the blades so that they are protected from contact with each other during shipment and may thus be delivered to the user with the teeth as sharp as they left the factory.

In a preferred embodiment and practice of our invention, we provide a table adapted to support a band placed thereon on edge with means for advancing the band along a predetermined path. We deliver a wrapping strip longitudinally of the blade and provide spaced folding guides for turning up the edges of the strip about the blade and then turning one of the edges downwardly over the upper edge of the blade. We continue the application of the wrapping strip until the entire length of the band has been covered. In wrapping endless bands, we make the last fold in the wrapping strip toward the interior of the band. After the wrapping has been completed, we turn the band inside out, thus stretching the lapped edges of the wrapping strip so that there is no tendency for the edges to unfold. The means for pulling the blade and wrapping strip through the folding guides is preferably a pair of pinch rolls which serve to crease the folds in the wrapping strip.

A complete understanding of the invention may be obtained from the following detailed description which refers to the accompanying drawings illustrating a preferred embodiment and practice. In the drawings, Figure 1 is a plan view of our wrapping apparatus;

Figure 2 is an elevation thereof;

Figure 9 is a plan view of the table to enlarged scale with the folding guides removed;

Figure 10 is a transverse section taken along the plane of line X—X of Figure 9;

Figure 11 is a similar section taken along the plane of line XI—XI of Figure 1;

Figures 3, 4, 5, 6:
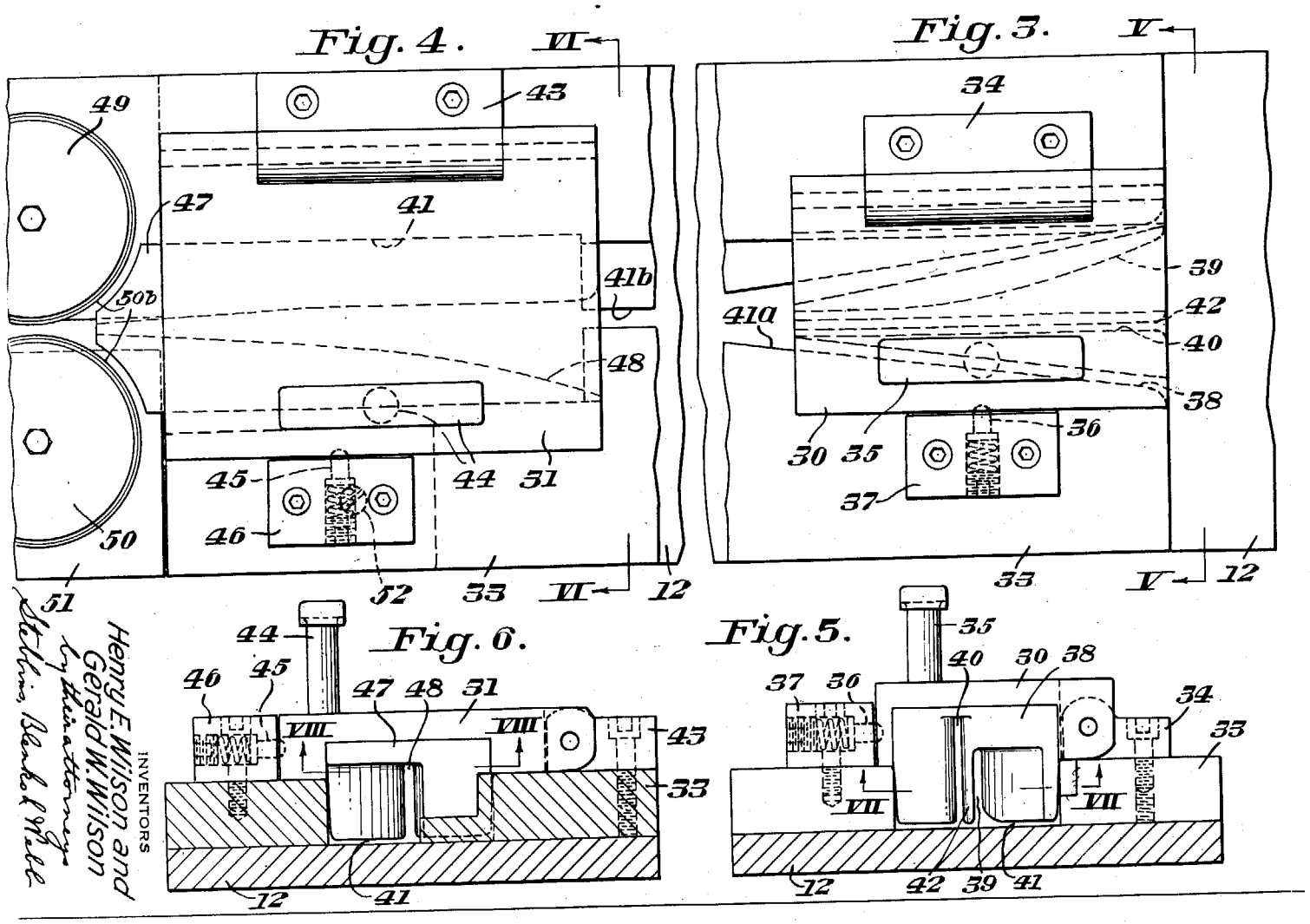
Figures 3 and 4 are plan views to enlarged scale of the folding guides.
Figure 5 is a transverse section taken along the plane of line V—V of Figure 3, showing the first folding guide in elevation.
Figure 6 is a similar section taken along the plane of line VI—VI of Figure 4, showing the second folding guide in elevation.
Figure 7:
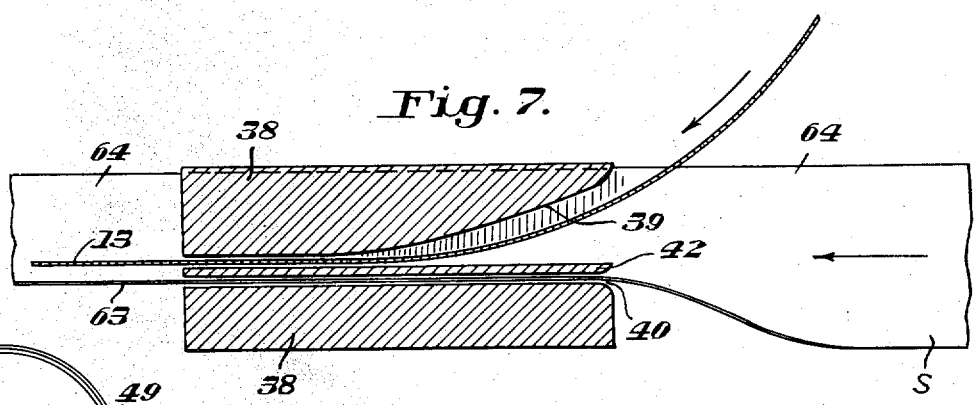
Figure 7 is a horizontal section through the first folding guide taken along the plane of line VII—VII of Figure 5.
Figure 8:
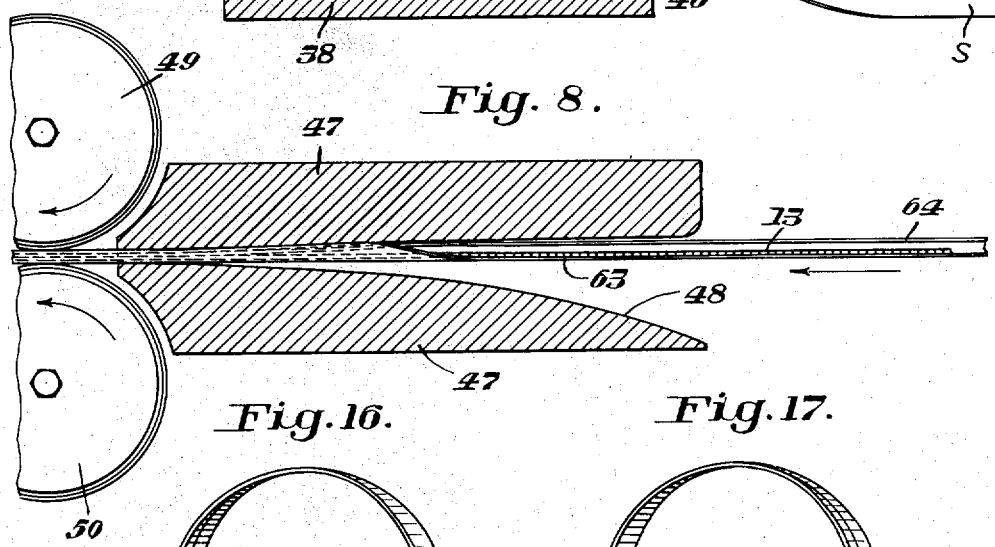
Figure 8 is a similar section through the second folding guide taken along the plane of line VIII—VIII of Figure 6.

Referring in detail to the drawings, and, for the present, particularly to Figures 1 and 2, our apparatus comprises a table 10 including a band-supporting portion 11 of any desired size and a strip-feeding and folding portion 12. The table is adapted to support an endless band 13 on edge for movement through a predetermined path during which movement the wrapping strip is progressively applied thereto and folded thereabout.

The strip-feeding portion 12 of the table 10 has legs 14 and 15. A roll of wrapping strip 16 is disposed in a suitable holder 17 attached to the legs 15 and the strip S drawn therefrom passes over a guide roll 18 at the right-hand end of the table. The strip is fed along the table between side guides 19 and under a tensioning foot 20 pivotally mounted in a block 21. The strip then passes through manually operated cross cut shear 22. As shown in Figure 11, this shear comprises a lever 23 having a blade 23a thereon pivoted to a post 24 on a bolt 25 having a compression spring thereon. The shear blade is normally held in raised position by a tension spring 26 secured thereto and to a bolt 27 on a guide post 28. The posts 24 and 28 are secured to the sides of the strip-feeding portion 12 of the table. The end of the lever 23 remote from the post 24 projects beyond the post 28 and forms an operating handle. It will be apparent that the strip S may be cut off when desired by downward movement of the lever 23. The shear 22 serves to sever the strip when the wrapping of a band has been completed.

A guide roller 29 at one side of the portion 12 of the table beyond the shear 22 directs the band 13 as it approaches said portion and successively enters strip-folding guides 30 and 31. A guide 32 adjacent the roller 29 insures the proper entry of the wrapping strip under the lower edge of the band. The guides 30 and 31 are in the form of blocks hinged to a plate 33 on the strip-feeding portion 12 of the table. This plate is actually formed of two pieces but will be referred to as a single member. As clearly shown in Figures 3 and 5, the guide 30 is pivoted to a hinge block 34, has an operating handle 35 and is yieldably held in operative position by a spring pressed detent 36 mounted in a block 37. The guide 30 has an insert 38 which may conveniently be of fiber or other easily machinable material. The insert is removably secured in place by any convenient means and is provided with longitudinal slots 39 and 40. The insert 38 extends downwardly into a central longitudinal recess 41 in plate 33. As shown in Figure 9, the recess includes a tapering entrance 41a, a restricted portion 41b and a wider portion 41c. The slot 39 is dimensioned to admit the band 13 as it is moved forward through the guide by traction means to be described subsequently. The slot flares toward the entrance end as clearly shown in Figures 3 and 5. The slot 40 is adapted to receive one edge of the strip S and serves, when the edge is properly started thereinto, progressively to fold up the edge as shown in Figure 1. The material of the insert 38 which is left when the slots 39 and 40 are cut out forms a central longitudinal guide fin 42.

The folding guide 31 also comprises a block pivoted to a hinge block 43. It has a handle 44 and is yieldably held in operative position by a spring-pressed detent 45 in a block 46. An insert 47 of fiber or the like is removably secured to the block 31 and extends downwardly therefrom into the recess 41c. The insert 47 has a longitudinal slot 48 therein flaring toward the entrance end which admits the band with both edges of the wrapping strip folded upwardly around the lower edge of the band. As the band and strip enter the guide 30, the edge of the strip projecting above the band is progressively folded downwardly therearound.

The traction means for pulling the band and wrapping strip through the guides 30 and 31 comprises a pair of pinch rolls 49 and 50 as shown to enlarged scale in Figures 9 and 10. The roll 49 is mounted on a shaft 49a journaled in the table portion 12. The roll 50 is mounted on a shaft 50a journaled in a block 51 pivoted to the table portion 12 on a pin 52. A compression spring 53 disposed in recesses in the table portion 12 and the block 51 normally urges the latter outwardly whereby the rolls are opened. A shaft 54 extending through the block 51 and threaded into a tapped hole in the table portion 12 has a fixed side cam 55 thereon. A rotatable side cam 56 cooperating therewith has an operating lever 57. Thus by throwing the lever, the block 51 is forced toward the table portion 12 against the compression spring 53, thereby bringing the pinch rolls into engagement with a band disposed therebetween. The rolls preferably have tires 50b of material such as rubber having a suitable coefficient of friction to enable the rolls to exert the desired tractive force.

The shafts 49a and 50a have gears 58 thereon. The shaft 50a is driven by a motor 59 mounted on the legs 14 of the table, through a reducing gear 60 and a flexible coupling 61. The gears 58 are designed to permit slight movement of the block 51 incident to closing and opening the pinch rolls without disturbing the meshing relation thereof.

A guide roller 62 is journaled on the table portion 12 adjacent the pinch rolls to direct the portion of the band leaving the latter.

Figure 13:
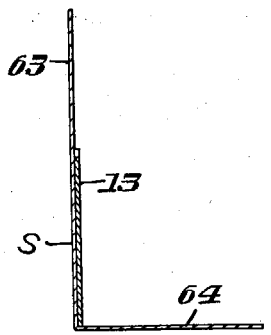
Figures 13 through 15 are sections through the strip as it is being wrapped taken along the planes of the correspondingly numbered lines of Figure 12.
Figure 14:
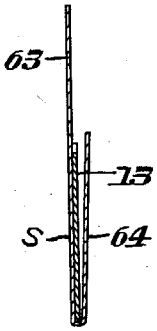
Figure 15:
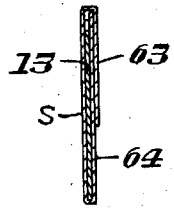

In utilizing the apparatus described above to perform our method of wrapping endless bands, a band, such as that shown at 13, is placed on the table 11. The folding guides 30 and 31 having been swung upwardly and back out of the way and the pinch rolls having been opened up, the band is disposed in the recess 41 and between the pinch rolls. The leading end of the strip S is manually drawn forward from the shear 22 under the guide 32 and through the restricted portion 41b of the recess 41, the edges of the strip, of course, being folded up to permit this. The strip is so disposed laterally of the table portion 12 that one edge thereof, when folded up about the band 13, will project upwardly above the upper edge thereof as shown in Figure 13. When both edges of the strip have been folded about the band, as shown in Figure 14, the strip edge projecting above the upper edge of the band is folded down thereover as shown in Figure 15. When the leading end of the strip thus folded has been disposed between the pinch rolls 49 and 50, the guide 31 is lowered to the position shown in Figure 6, the edge of the strip being manipulated manually to permit this. Next, the guide 30 is replaced in operative position. When these preparations have been completed, the lever 57 is turned down, thereby causing the pinch rolls to seize the band and the leading end of the wrapping strip which has been folded thereabout by hand. As soon as the pinch rolls grip the band enclosed in the folded wrapping strip, they pull both the band and strip forward through the guides 30 and 31. The latter progressively effect the folding of the strip edges about the band in the successive steps illustrated in Figures 12 through 15. That is to say, one edge of the strip, indicated at 63, is folded up by the guide 30, the other edge of the strip 64 remaining in its original plane and passing under the insert 38 of guide 30. It will be observed that the edge 63 when folded extends upwardly above the upper toothed edge of the band 13. On entering the restricted portion 41b of the recess 41, however, the edge 64 is progressively folded up. This condition is illustrated in Figure 14. The upwardly projecting edge 63 of the strip is folded down over the upper edge of the band 13 progressively on entering the insert 47 of guide 31. This condition is illustrated in Figure 15. It will be noted that the lapped edges 63 and 64 of the strip are on the inside of the loop formed by the band.

Figure 16:
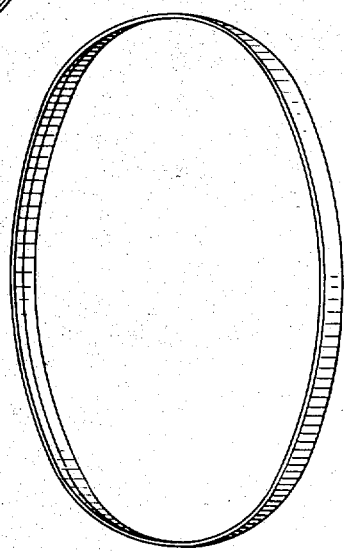
Figure 16 is a perspective view of a band after it has been wrapped.
Figure 17:
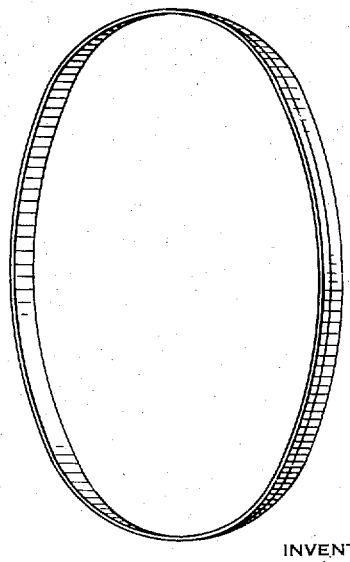
Figure 17 shows the same band after it has been turned inside out.
Figure 12:
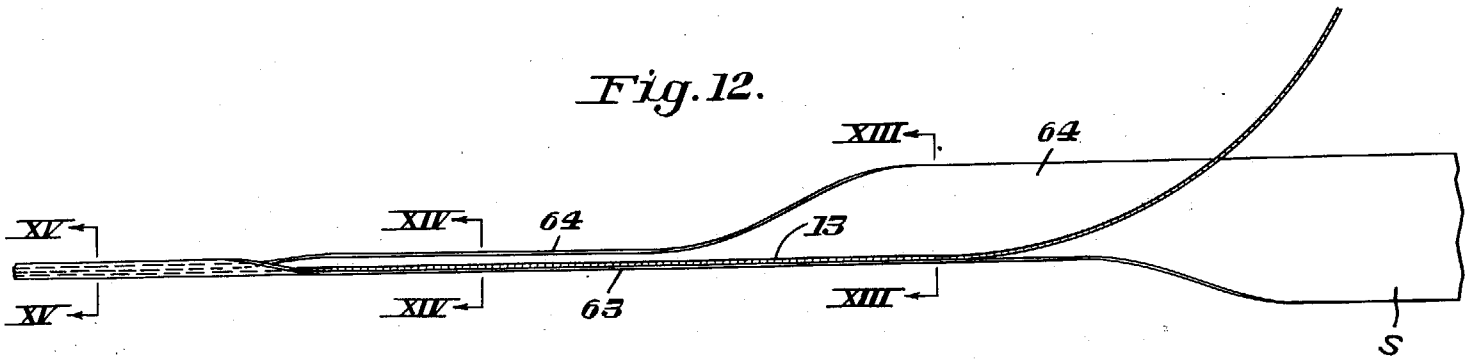
Figure 12 is a diagrammatic plan view to enlarged scale showing the several stages in the folding of the strip about the band.

Continued operation of the pinch rolls eventually brings the leading end of the wrapping strip toward the entering end of the guide 30. The operator then manipulates the shear 22 to cut off the strip at a point such that sufficient length is allowed to lap the leading end as it returns to starting position. When the severed trailing end of the strip has passed through the pinch rolls, the lever 37 is operated to release the latter, whereupon the wrapped band may be removed by raising the guides 30 and 31. The pinch rolls serve to crease the folds in the wrapping strip formed by the guides 30 and 31. When the band has been removed from the guides, it is in the condition shown in Figure 16, with the lapped edges of the wrapping strip on the inside. The band is then manually turned inside out to the position shown in Figure 17 with the lapped edges of the wrapping strip on the exterior. This places the lapped edges under a slight tension circumferentially of the band which is sufficient to prevent unwrapping without the application of seals or ties. The wrapped band is then doubled on itself to form a multiple loop suitable for packing in the usual cylindrical shaped container.

If will be apparent from the foregoing that our invention comprises a highly useful method and apparatus whereby endless bands such as band-saw blades may be wrapped easily and at high speed so that the cost of the wrapping operation is very small. The apparatus is relatively simple and inexpensively constructed and may be operated by relatively unskilled labor. The advantage of wrapped band-saw blades over bare blades from the standpoint of avoiding damage to the teeth edges during shipment and handling, is so obvious as to require no emphasis. A further advantage, of course, is that persons handling the blades are protected against injury by the sharp teeth thereof. While the invention has been explained with special reference to the wrapping of band-saw blades, it will be apparent that it may also be used for other articles as well.

Although we have illustrated and described but a preferred method and practice of our invention, it will be recognized that changes in the details of construction and procedure may be made without departing from the spirit of the invention or the scope of the appended claims.

We claim:

1. Apparatus for wrapping saw blades or the like comprising a [table] *generally planar support,* traction rolls thereon [adapted to engage a blade placed on edge on the table] *having their axes generally perpendicular to the support adapted to engage a blade disposed generally perpendicular to the support,* means for delivering a wrapping strip longitudinally of the blade, [and] guide [blocks spaced along the table effective progressively] *means through which the blade and wrapping strip pass engaging the edges of the wrapping strip* to fold the [edges of the strip] *same* around the blade as it is [pulled] *advanced* through the [blocks] *guide means* by said rolls, *mounting means on the support and a connection between the mounting means and the guide means movably mounting the guide means on the mounting means providing for lateral opening of the guide means.*

[2. Apparatus for wrapping saw blades or the like comprising a table adapted to support a blade on edge, means for advancing successive portions of the length of the blade along the table, a pair of spaced guide blocks directing said portions in a predetermined path, the first of said blocks having means for folding up about the blade the edges of a strip of wrapping material, the second of said blocks having means for folding one of said edges down over the blade.]

[3. The apparatus defined by claim 2 characterized by said advancing means comprising traction rolls adjacent the exit end of the second guide block.]

[4. Apparatus for wrapping saw blades or the like comprising a table adapted to support a blade on edge, folding guides spaced along the table, traction means for drawing the blade through said guides, and means for supplying a wrapping strip longitudinally of the portion of the blade between the guides, said guides being adapted respectively to fold the edges of the strip upwardly about the lower edge of the blade and downwardly over the upper edge of the blade.]

[5. Apparatus for progressively folding a wrapping strip longitudinally about an endless band such as a band-saw blade, comprising a table adapted to support a band on edge, traction means for pulling the band, spaced guides on the table having slots for the band to pass through, and means for delivering a wrapping strip longitudinally of the band, one of said guides also having surfaces effective progressively to fold the edges of the strip upwardly about the band.]

[6. The apparatus defined by claim 5 characterized by said one of said guides having a slot to accommodate an edge of the strip which extends above the band after the initial folding.]

[7. Apparatus for progressively folding a wrapping strip longitudinally about an endless band such as a band-saw blade, comprising a table adapted to support a band on edge, traction means for pulling the band, spaced guides on the table having slots for the band to pass through, and means for delivering a wrapping strip longitudinally of the band, one of said guides also having surfaces effective progressively to fold the edges of the strip upwardly about the band, the second guide having a surface effective progressively to fold down about the band an edge of the strip extending thereabove.]

[8. Apparatus for progressively folding a wrapping strip longitudinally about an endless band such as a band-saw blade, comprising a substantially horizontal table adapted to support a band on edge, traction means for pulling the band, means for delivering a wrapping strip longitudinally of the band, a guide block for progressively folding the edges of the strip upwardly about the band, and a second guide block for progressively folding down about the band one of said edges extending thereabove.]

[9. The apparatus defined by claim 8 characterized by said traction means being a pair of pinch rolls located adjacent the outlet of the second guide block adapted to crease the folds in said strip.]

[10. Apparatus for progressively folding a wrapping strip longitudinally about an endless band such as a band-saw blade, comprising a table adapted to support a band on edge, a pair of pinch rolls for pulling the band, means for supplying a wrapping strip longitudinally of the band, a guide block spaced from said rolls having a slot adapted to receive the band and surfaces adapted progressively to fold the edges of the strip upwardly about the band, and a second guide block adjacent the rolls having a slot adapted to accommodate the band and a surface adapted progressively to fold down about the band an edge of the strip extending thereabove.]

[11. The apparatus defined by claim 10 characterized by said blocks being liftable from the table and said slots and surfaces being formed in the bottoms of said blocks.]

[12. The apparatus defined by claim 10 characterized by said slots and surfaces being formed in the bottoms of said blocks, and said blocks being hinged to said table whereby they may be thrown up out of the way facilitating the starting of a band between said rolls and its removal therefrom when wrapped.]

[13. The apparatus defined by claim 10 characterized by means for causing said rolls to engage and release a band disposed therebetween.]

[14. In a method of wrapping an endless band such as a band-saw blade, the steps including placing the band with one of its edges on a substantially horizontal supporting surface, pulling the band along a predetermined path, feeding a strip of wrapping material along said path and progressively folding the edges of the strip around the band.]

[15. In a method of wrapping an endless band such as a band-saw blade, the steps including placing the band with one of its edges on a substantially horizontal supporting surface, feeding a strip of wrapping material along a portion of the length of the band, folding the end of the strip about the band, drawing the band and strip along a predetermined path and progressively folding the strip about the band throughout its length.]

[16. In a method of wrapping a saw blade, the steps including placing the blade with one of its edges on a substantially horizontal supporting surface, pulling the blade along a predetermined path, feeding a strip of wrapping material along said path, folding both edges of the strip upwardly alongside the blade with one edge extending above the blade, folding said one edge downwardly over the blade, and continuing said folding progressively throughout the length of the blade.]

17. In a method of wrapping an endless band such as a band-saw blade, the steps including advancing successive portions of the length of the band along a predetermined path, progressively folding the edges of a strip of wrapping material around the band toward the inside of the loop formed thereby, with one of said edges overlapping the other, and turning the fully wrapped band inside out so the edges of the strip are disposed on the outside of the band.

[18. Apparatus for progressively folding a wrapping strip longitudinally about an endless band such as a band-saw blade, comprising a table adapted to support a band on edge, traction means for pulling the band, means for delivering a wrapping strip longitudinally of the band, and guide means for progressively folding the edges of the strip upwardly about the band, said guide means including a block having a slot to accommodate the band and a slot to accommodate an edge of the strip extending above the band when folded.]

[19. In a method of wrapping a flat blade, the steps comprising simultaneously advancing the blade and a wrapping strip generally longitudinally of the blade and with the wrapping strip in contact with one of the edges of the blade and during said advance progressively folding the wrapping strip so that portions of it lie on opposite sides of the blade with at least one of said portions extending beyond the opposite edge of the blade and turning said portion of the wrapping strip about said opposite edge of the blade.]

*20. Apparatus for applying to and folding transversely about an endless flexible flat band an elongated wrapping strip extending along the band comprising means advancing longitudinally the band and strip in face-to-face relation including opposed pinch rolls pressing the opposed flat faces of the band and strip directly together and strip folding means separate from the pinch rolls acting on the strip to fold it about the band as the band and strip are advanced together therethrough, mounting means and a connection between the mounting means and the strip folding means movably mounting the strip folding means on the mounting means providing for lateral opening of the strip folding means to permit introduction thereinto of the endless band at the beginning of the operation and removal of the wrapped endless band at the conclusion thereof.*

*21. Apparatus for progressively folding a wrapping strip longitudinally about an endless band such as a band-saw blade, comprising a table adapted to support a band on edge, a pair of pinch rolls for pulling the band, means for supplying a wrapping strip longitudinally of the band, a guide block spaced from said rolls having a slot adapted to receive the band and surfaces adapted progressively to fold the edges of the strip upwardly about the band, and a second guide block adjacent the rolls having a slot adapted to accommodate the band and a surface adapted progressively to fold down about the band an edge of the strip extending thereabove, said blocks being liftable from the table and said slots and surfaces being formed in the bottoms of said blocks.*

*22. Apparatus for progressively folding a wrapping strip longitudinally about an endless band such as a band-saw blade, comprising a table adapted to support a band on edge, a pair of pinch rolls for pulling the band, means for supplying a wrapping strip longitudinally of the band, a guide block spaced from said rolls having a slot adapted to receive the band and surfaces adapted progressively to fold the edges of the strip upwardly about the band, and a second guide block adjacent the rolls having a slot adapted to accommodate the band and a surface adapted progressively to fold down about the band an edge of the strip extending thereabove, said slots and surfaces being formed in the bottoms of said blocks, and said blocks being hinged to said table whereby they may be thrown up out of the way facilitating the starting of a band between said rolls and its removal therefrom when wrapped.*

*23. In a method of wrapping an endless flexible flat band having cutting means at one edge thereof, the steps comprising disposing a portion of the band in a wrapping path, also disposing in the wrapping path a portion of a wrapping strip wider than the band with said portion of the band and said portion of the wrapping strip in face-to-face contact, pressing the flat faces of the band and wrapping strip together and advancing the band and wrapping strip lengthwise through force applied between the inside and the outside of the band generally in a plane normal to the band and wrapping strip until the length of wrapping strip thus advanced is at least substantially equal to the circumferential length of the band so that the wrapping strip at least approximately overlaps itself and in the wrapping path progressively folding the wrapping strip about the band during such advance.*

*24. In a method of wrapping an endless flexible flat band having cutting means at one edge thereof, the steps comprising introducing laterally into a wrapping path a portion of the band, introducing longitudinally into the wrapping path the leading end of an elongated wrapping strip wider than the band with said portion of the band and the leading end of the wrapping strip in face-to-face contact, pressing the flat faces of the band and wrapping strip together and applying tractive force to the band and wrapping strip between the inside and the outside of*

*the band generally in a plane normal to the band and wrapping strip and thereby advancing the band and wrapping strip lengthwise until the length of wrapping strip thus advanced is at least substantially equal to the circumferential length of the band, in the wrapping path progressively folding the wrapping strip about the band during such advance and withdrawing laterally from the wrapping path the portion of the wrapped band disposed in the wrapping path upon completion of the wrapping.*

*25. In a method of wrapping an endless flexible flat band having cutting means at one edge thereof, the steps comprising disposing a portion of the band in a substantially straight wrapping path, also disposing in the wrapping path a portion of a wrapping strip wider than the band with said portion of the band and said portion of the wrapping strip in face-to-face contact, pressing the flat faces of the band and wrapping strip together and advancing the band and wrapping strip lengthwise through force applied between the inside and the outside of the band generally in a plane normal to the band and wrapping strip until the length of wrapping strip thus advanced is at least substantially equal to the circumferential length of the band so that the wrapping strip at least approximately overlaps itself and in the wrapping path progressively folding the wrapping strip about the band during such advance.*

HENRY E. WILSON.
GERALD W. WILSON.

REFERENCES CITED

The following references are of record in the file of this patent or the original patent:

UNITED STATES PATENTS

| Number | Name | Date |
|---|---|---|
| 1,370,381 | Tarbox | Mar. 1, 1921 |
| 1,446,171 | Frazier et al. | Feb. 20, 1923 |
| 1,500,472 | Scherner | July 8, 1924 |
| 1,545,022 | Wheildon | July 7, 1925 |
| 1,750,059 | Selden | Mar. 11, 1930 |
| 1,837,840 | Slusher | Dec. 22, 1931 |
| 2,010,082 | Hill | Aug. 6, 1935 |
| 2,033,201 | MacChesney | Mar. 10, 1936 |
| 2,109,504 | Ringler | Mar. 1, 1938 |
| 2,114,833 | Fincke | Apr. 19, 1938 |
| 2,117,347 | Molins | May 17, 1938 |
| 2,168,583 | Ringler | Aug. 8, 1939 |
| 2,200,605 | Pierce | May 14, 1940 |
| 2,276,282 | Bindszus | Mar. 17, 1942 |

FOREIGN PATENTS

| Number | Country | Date |
|---|---|---|
| 327,229 | Great Britain | Apr. 3, 1930 |